United States Patent
Ishiyama

(10) Patent No.: US 10,788,121 B2
(45) Date of Patent: Sep. 29, 2020

(54) SHIFT DEVICE

(71) Applicant: ALPS ALPINE CO., LTD., Tokyo (JP)

(72) Inventor: Momoko Ishiyama, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/582,271

(22) Filed: Sep. 25, 2019

(65) Prior Publication Data
US 2020/0018391 A1    Jan. 16, 2020

Related U.S. Application Data

(63) Continuation of application No. PCT/JP2018/005313, filed on Feb. 15, 2018.

(30) Foreign Application Priority Data

Apr. 6, 2017  (JP) ................. 2017-076127

(51) Int. Cl.
*F16H 59/10*     (2006.01)
*G05G 1/04*      (2006.01)
(Continued)

(52) U.S. Cl.
CPC ......... *F16H 59/0217* (2013.01); *B60K 20/02* (2013.01); *F16H 59/0278* (2013.01);
(Continued)

(58) Field of Classification Search
CPC ............. F16H 59/0217; F16H 59/0278; F16H 59/044; F16H 59/10; F16H 59/105;
(Continued)

(56) References Cited

U.S. PATENT DOCUMENTS 6,508,139 B2 *  1/2003  Onodera ............... F16H 59/105
74/335
6,927,671 B2 *  8/2005  Debono ............... B60R 25/066
180/287

(Continued)

FOREIGN PATENT DOCUMENTS

EP         1182381 A2 *  2/2002  ............. F16H 61/22
JP       2000-289482      10/2000
(Continued)

OTHER PUBLICATIONS

International Search Report dated Mar. 27, 2018 in PCT/JP2018/005313 filed on Feb. 15, 2018.

*Primary Examiner* — Adam D Rogers
(74) *Attorney, Agent, or Firm* — IPUSA, PLLC

(57) ABSTRACT

A shift device includes a shift lever configured to move to a plurality of positions, a grip section mounted on the shift lever and configured to be grasped by a user, a contact detecting section mounted on the grip section and configured to detect contact with the user, a restricting section configured to restrict a movement of the shift lever, and a releasing section configured to determine whether the grip section is grasped by the user based on a result of detection by the contact detecting section, and release the shift lever from restriction on the movement upon determining that the grip section is grasped by the user.

6 Claims, 4 Drawing Sheets

(51) Int. Cl.
*B60K 20/02* (2006.01)
*F16H 59/02* (2006.01)

(52) U.S. Cl.
CPC ............ *F16H 59/105* (2013.01); *G05G 1/04* (2013.01); *F16H 2059/0282* (2013.01)

(58) Field of Classification Search
CPC .... F16H 2059/0282; G05G 1/04; G05G 1/06; G05G 5/005; G05G 5/02; G05G 5/28; B60K 20/02
See application file for complete search history.

(56) References Cited

U.S. PATENT DOCUMENTS

| | | | |
|---|---|---|---|
| 2002/0020236 A1 | 2/2002 | Onodera | |
| 2003/0197592 A1* | 10/2003 | Mokler | E02F 9/2004 340/5.31 |
| 2005/0126326 A1* | 6/2005 | Onodera | F16H 59/0204 74/473.18 |
| 2013/0325151 A1* | 12/2013 | Wadia | B60K 28/06 700/85 |

FOREIGN PATENT DOCUMENTS

| | | |
|---|---|---|
| JP | 2002-059756 | 2/2002 |
| JP | 2005-047406 | 2/2005 |
| JP | 2009-132283 | 6/2009 |

\* cited by examiner

SHIFT DEVICE

CROSS-REFERENCE TO RELATED APPLICATION

This application is a continuation application of International Application No. PCT/JP2018/005313, filed Feb. 15, 2018, and designated the U.S., which is based upon and claims priority to Japanese Patent Application No. 2017-076127, filed Apr. 6, 2017, the entire contents of which are incorporated herein by reference.

BACKGROUND OF THE INVENTION

1. Field of the Invention

The present disclosure relates to a shift device.

2. Description of the Related Art

In general, a shift device is known to include a locking mechanism for restricting movement of a shift lever and a select button mounted on the shift lever. In such a shift device, restrictions applied by the locking mechanism are removed when the select button is pushed.

Also, some shift devices equipped with a locking mechanism are configured such that restrictions by the locking mechanism are not applied at a given shift position (e.g., N range) in order to avoid operational delays in an emergency. See, Japanese Unexamined Patent Publication No. 2005-47406.

SUMMARY OF THE INVENTION

A shift device according to one embodiment includes a shift lever configured to move to a plurality of positions, a grip section mounted on the shift lever and configured to be grasped by a user, a contact detecting section mounted on the grip section and configured to detect contact with the user, a restricting section configured to restrict movement of the shift lever, and a releasing section configured to determine whether the grip section is grasped by the user based on a result of detection by the contact detecting section, and release the shift lever from restriction of the movement upon determining that the grip section is grasped by the user.

DESCRIPTION OF THE PREFERRED EMBODIMENTS

Figure 1:
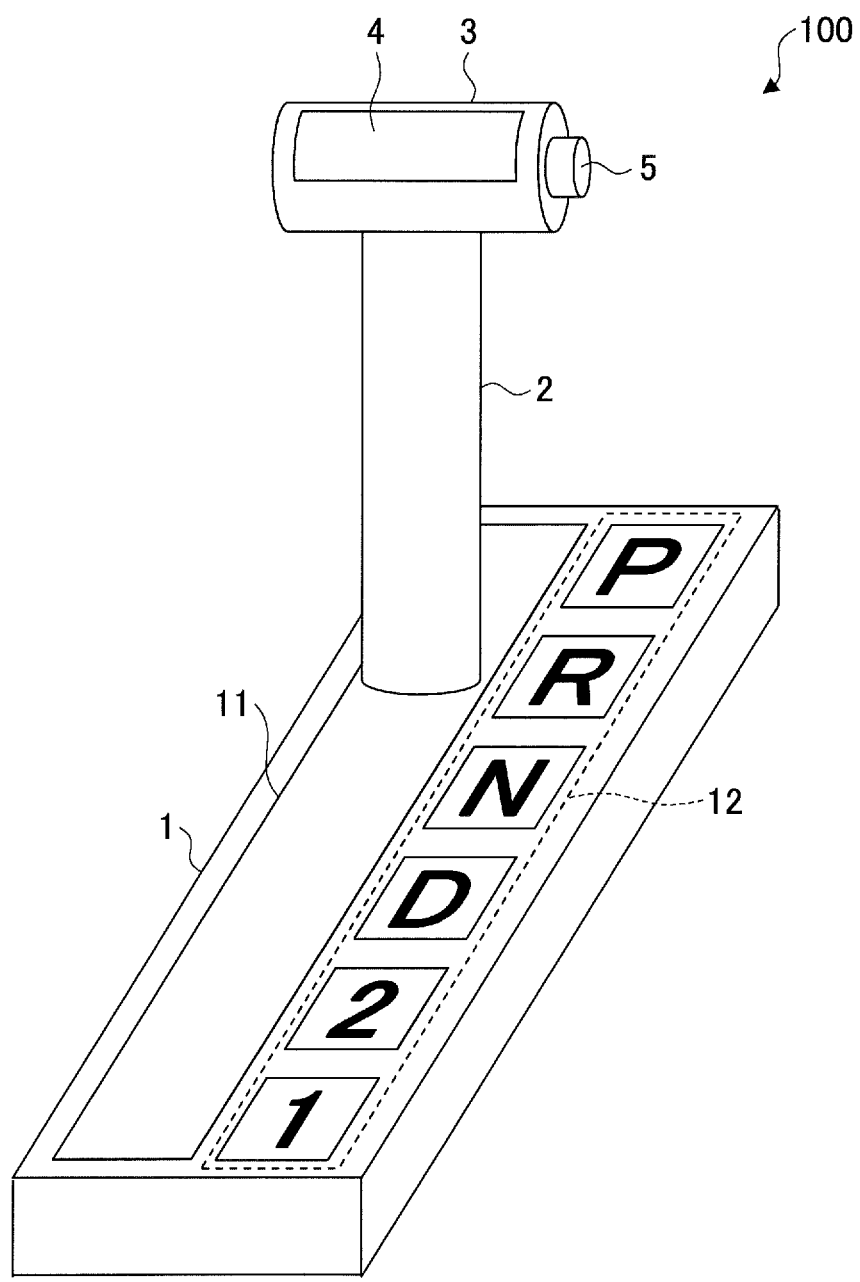
FIG. 1 is an external perspective view of an example of a shift device.

In the shift device known to the inventor, when an object hits the shift lever positioned at a shift position where there are no restrictions by the locking mechanism, the shift lever may be moved without operator's intent, and thus may affect operation.

In view of the problem recognized by the inventor, the present disclosure provides one or more embodiments so as to avoid erroneous operation of a shift lever.

Each embodiment according to the present invention will be described hereinafter with reference to the drawings. Note that in the description and drawings according to each embodiment, same reference numerals are used to denote elements that include a substantially same functional configuration; accordingly, for those elements, repetitive explanation may be omitted.

A shift device 100 according to one embodiment will be described with reference to FIGS. 1 to 4. The shift device 100 according to the present embodiment is a device that is operated by a vehicle operator in order to switch positions (gears). The shift device 100 is disposed in surroundings of an operator's seat.

FIG. 1 is an external perspective view of an example of the shift device 100 according to the present embodiment. In FIG. 1, the shift device 100 includes a shift panel 1, a shift lever 2, a grip section 3, a contact detecting section 4, and a release button (select button) 5.

The shift panel 1 is a panel that covers a surface of the shift device 100, and the surface of the shift panel 1 is exposed in a vehicle. The shift panel 1 includes a movement section 11 and a display section 12.

The movement section 11 is an opening in which the shift lever 2 is moved. In the movement section 11, a plurality of shift positions corresponding to respective different gears are preliminarily set. When the operator shifts the shift lever 2 to a given position, vehicle gears are switched so as to correspond to given positions.

The display section 12 is a part where a location that reflects a given shift position is displayed as well as the gears corresponding to the respective shift positions. The display section 12 is provided on the surface of the shift panel 1. In the example of FIG. 1, as the vehicle gears, P (parking), R (return), N (neutral), D (drive), 2 (second), and 1 (first) are displayed. In the movement section 11, a location adjacent to a given gear displayed by the display section 12 corresponds to a shift position indicative of the given gear. In the example of FIG. 1, the shift lever 2 is positioned at a shift position corresponding to R. In the following description, shift positions of P, R, N, D, 2, and 1 are referred to as P range, R range, N range, D range, 2 range, and 1 range, respectively.

Note that a vehicle gear type and arrangement and the shape of the shift panel 1 are not limited to the examples described above. The display section 12 may be provided on a surface of the grip section 3, instead of the surface of the shift panel 1. The shift panel 1 may be removed from the shift device 100.

The shift lever 2 is a bar member that is provided through the movement section 11 and that stands from below the shift panel 1. A base (lower end) of the shift lever 2 is attached to the vehicle so as to be movably positioned at each shift position. The grip section 3 is provided at a tip end (upper end) of the shift lever 2.

The grip section 3 is a knob provided at the tip end of the shift lever 2, and is grasped by the operator (user). When the operator grasps the grip section 3 to move it, the shift lever 2 is moved accordingly. The grip section 3 may be provided in a portion (e.g., the middle of the shift lever, etc.) other than the tip end of the shift lever 2.

The contact detecting section 4 is provided on the surface of the grip section 3. Upon detecting contact with an operator's hand, the contact detecting section 4 detects the operator grasping the grip section 3. The contact detecting section 4 includes any sensor capable of detecting contact with an operator, such as a pressure sensor or a capacitive sensor. Upon detecting the operator contacting the grip section 3, the contact detecting section 4 outputs a contact signal (detected result) indicating that the contact has been detected.

In the example of FIG. 1, the contact detecting section 4 is a sheet sensor that covers a portion of the surface of the grip section 3. In this case, an area of the contact detecting section 4 may be larger. For example, the contact detecting section 4 may have a surface area that is more than a third of the surface area of the grip section 3. In such a manner, the contact detecting section 4 can reliably detect contact with the operator. Further, a releasing section 7 to be described below can accurately distinguish between the operator's grasp on the grip section 3 and contact with the grip section 3 unintended by the operator, on a basis of the contact signal.

Note that the contact detecting section 4 may include a plurality of sensors that are in a dotted, linear pattern, or a sheet-like pattern, each sensor being provided on the surface of the grip section 3. In this case, the sensors that constitute the contact detecting section 4 may be separately disposed so as to be interspersed over a large surface area (e.g., an area accounting for more than a third) of the grip section 3. In such a configuration, the contact detecting section 4 can reliably detect contact with the operator. Further, the releasing section 7 described below can accurately distinguish between the operator's grasp on the grip section 3 and contact with the grip section 3 unintended by the operator, based on the contact signal.

The release button 5 is a hardware button that is mounted on the grip section 3 in order to release the shift lever 2 from restriction of movement. When the operator pushes the release button 5, the shift lever 2 can be released from the restriction of movement. When the release button 5 is pushed by the operator, the release button 5 outputs a push signal indicating that it has been pushed.

Figure 2:
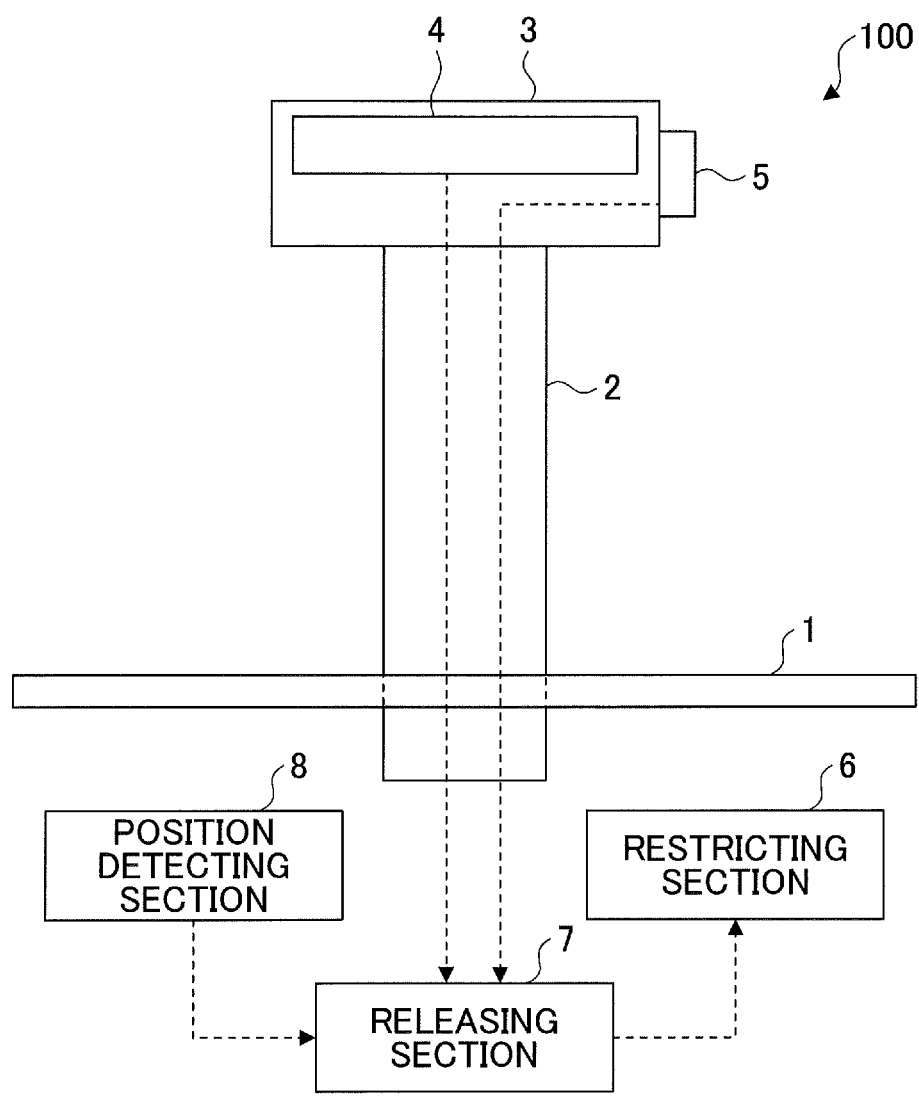
FIG. 2 is a side view of an example of the shift device.

FIG. 2 is a side view of an example of the shift device 100 according to the present embodiment. Dashed arrows in FIG. 2 indicate a main flow of signal. As illustrated in FIG. 2, the shift device 100 further includes a restricting section 6, a releasing section 7, and a position detecting section 8. The restricting section 6, the releasing section 7, and the position detecting section 8 are disposed below the shift panel 1, as illustrated in FIG. 2.

The restricting section 6 is a device that restricts movement of the shift lever 2. As the restricting section 6, any locking mechanism that restricts movement of the shift lever 2 by an electromagnetic mechanism or a mechanical mechanism can be used. In the present embodiment, the restricting section 6 restricts the movement of the shift lever 2 without a limitation to a position of the shift lever 2. The restriction by the restricting section 6 is removed by the releasing section 7. In other words, the restriction by the restricting section 6 is not removed unless the releasing section 7 removes it.

The releasing section 7 is a control circuit that releases the shift lever 2 from restriction of movement. The releasing section 7 includes a microcomputer, an ECU (Engine Control Unit), or the like. The releasing section 7 is connected to the contact detecting section 4, the release button 5, and the position detecting section 8 via signal lines. The releasing section 7 receives an output signal from each of the contact detecting section 4, the release button 5, and the position detecting section 8. The releasing section 7 determines whether to remove restriction by the restricting section 6 on a basis of one or more signals inputted from the contact detecting section 4, the release button 5, and the position detecting section 8. When it is determined that the restriction by the restricting section 6 to be removed, the releasing section 7 removes the restriction by the restricting section 6.

Note that in the example of FIG. 2, it is assumed that when the releasing section 7 is connected to the restricting section 6 via the signal line, the releasing section 7 controls the restricting section 6 to remove the restriction. However, when the releasing section 7 is connected to an external mechanism, which removes restriction by the restricting section 6, via a signal line, the releasing section 7 may control the external mechanism to cause the external mechanism to remove the restriction.

The position detecting section 8 detects a position of the shift lever 2. The position detecting section 8 includes any sensor capable of detecting a position of the shift lever 2, such as a magnetic sensor or a rotary sensor. When detecting a position of the shift lever 2, the position detecting section 8 outputs a position signal indicating a detected position.

Hereafter, a method for removing restriction according to the present embodiment will be described.

In the present embodiment, when the release button 5 is pushed, the releasing section 7 removes restriction by the restricting section 6. That is, when receiving a push signal from the release button 5, the releasing section 7 removes the restriction by the restricting section 6. When the release button 5 is pushed, the restriction is removed without using one or more signals from the contact detecting section 4 and the position detecting section 8.

When the release button 5 is not pushed, in a case where the shift lever 2 is positioned at a first position and an operator grasps the grip section 3, the releasing section 7 removes restriction from a first position to a second position, which is applied by the restricting section 6. That is, when receiving, from the position detecting section 8, a position signal indicating that the shift lever 2 is positioned at the first position and determining that the operator grasps the grip section 3, the releasing section 7 removes the restriction from the first position to the second position, which is applied by the restricting section 6.

When contact with the operator is not detected by the contact detecting section 4, the releasing section 7 determines that the operator does not grasp the grip section 3.

On the other hand, for example, when contact with the operator is detected by the contact detecting section 4, i.e., when a contact signal is received from the contact detecting section 4, the releasing section 7 determines that the operator grasps the grip section 3. Also, when a contact signal is received from the contact detecting section 4 and the contact signal meets a predetermined condition, the releasing section 7 may determine that the operator grasps the grip section 3. The predetermined condition is taken as a case where contact with an operator is continuously detected for a period of time meeting or exceeding a predetermined period, a case where signal strength of a contact signal meets or exceeds a predetermined threshold, and the like.

As described above, upon determining whether the operator grasps the grip section 3 based on the contact signal, the releasing section 7 can distinguish between the operator's grasp on the grip section 3 and contact with the grip section 3 unintended by the operator.

When the contact detecting section 4 includes a sheet sensor having a large area or a plurality of sensors that are spaced apart in a large area, in a case where contact with the operator is detected at a plurality of points that are spaced apart, the releasing section 7 may determine that the operator grasps the grip section 3. Thereby, the releasing section 7 can accurately distinguish between the operator's grasp on the grip section and contact with the grip section 3 unintended by the operator (e.g., accidental contact with a fingertip).

The first position is a shift position at which a restriction on shifting to the second position is removed through an operator grasping the grip section 3. One or more shift positions are preset as one or more first positions. When the shift lever 2 is positioned at the first position, the restriction by the restricting section 6 can be removed by the operator grasping the grip section 3 only without pushing the release button 5. In such a manner, as the first position, a shift position such as the D range or the N range may be set, where emergency operation is required. This allows the operator to quickly move the shift lever 2 from the first position to the second position in an emergency.

The second position is a shift position at which restriction of movement from the first position is removed through the operator grasping the grip section 3. As one or more second positions, one or more shift positions are preset. The second positions are set with respect to respective first positions. As illustrated in the example of FIG. 1, when the shift positions are arranged in line, the second position is set as a shift position adjacent to the first position.

Figure 3:
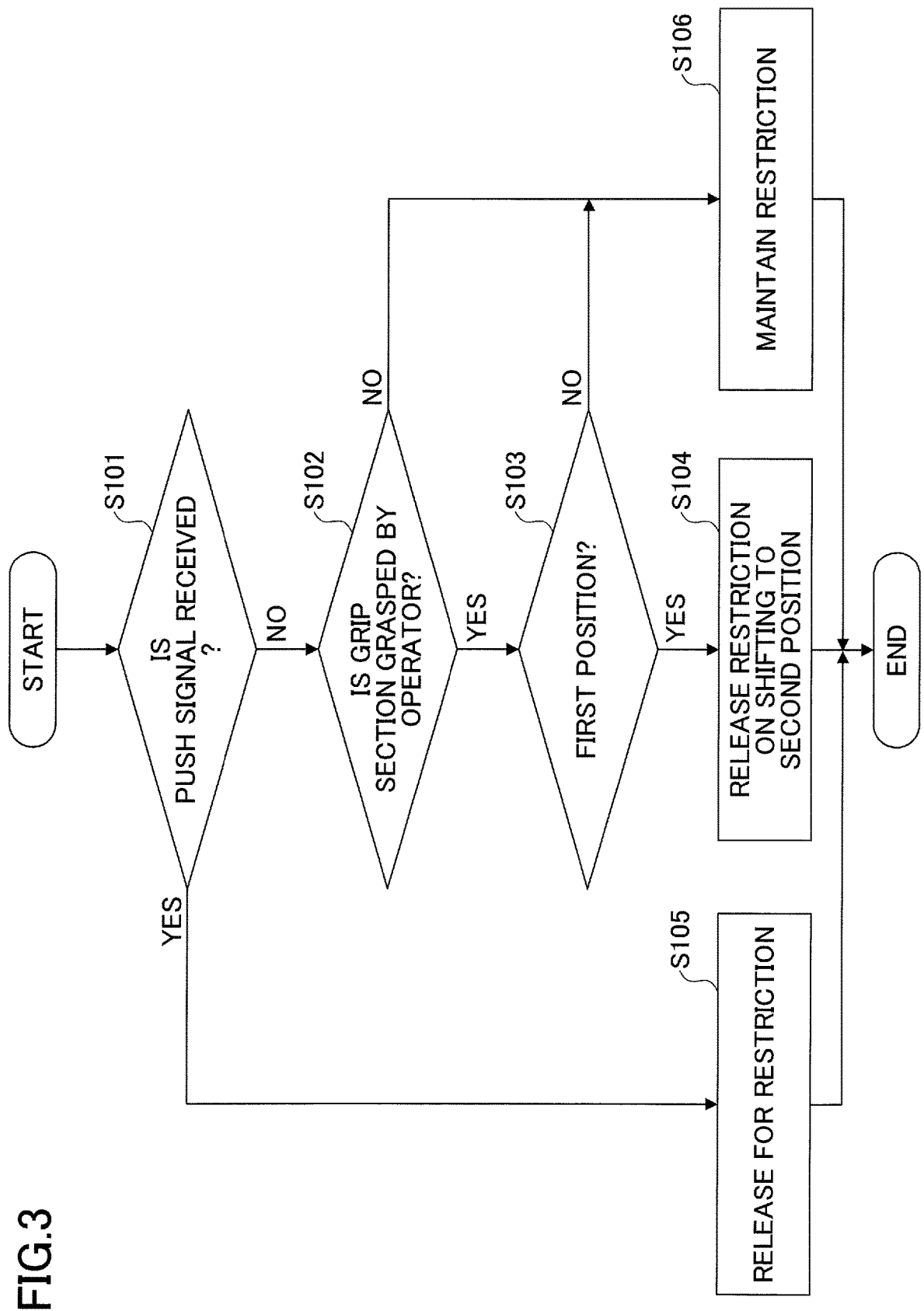
FIG. 3 is a flowchart illustrating an example of a release process of restrictions.

FIG. 3 is a flowchart illustrating an example of a release process of restriction according to the present embodiment. In the present embodiment, the releasing section 7 performs a process illustrated in FIG. 3 every time a signal is received from one of the contact detecting section 4, the release button 5, and the position detecting section 8, or periodically.

First, the releasing section 7 determines whether the release button 5 is pushed, i.e., whether a push signal is received from the release button 5 (step S101).

When a push signal is received (YES in step S101), the releasing section 7 removes restriction by the restricting section 6 (step S105). Thereby, an operator can move the shift lever 2 to a desired shift position. The releasing section 7 maintains release of the restriction while the shift lever 2 is moving. In a case where a new shift position of the shift lever 2 is detected by the position detecting section 8, the release of the restriction is terminated. The preceding shift position is included with respect to new shift positions.

When a push signal is not received (No in step S101), the releasing section 7 determines whether the operator grasps the grip section 3 based on a contact signal (step S102). The method of such determination is described above.

When a contact signal is not received, i.e., when it is determined that the operator does not grasp the grip section 3 (NO in step S102), the releasing section 7 does not remove restriction by the restricting section 6 (step S106). The process is then finished.

When it is determined that the operator grasps the grip section 3 based on a contact signal (YES in step S102), the releasing section 7 determines whether the shift lever 2 is positioned at the first position, i.e., whether a position signal indicating that the shift lever 2 is positioned at the first position is received from the position detecting section 8 (step S103).

When a position signal indicating that the shift lever 2 is positioned at a shift position other than a first position is received, i.e., when a position signal indicating that the shift lever 2 is positioned at a first position is not received (NO in step S103), the releasing section 7 does not remove restriction by the restricting section 6 (step S106). The process is then finished.

When a position signal indicating that the shift lever 2 is positioned at a first shift position is received (YES in step S103), the releasing section 7 removes a restriction on shifting to the second position in accordance with the shift lever 2, by the restricting section 6 (step S104). Thereby, the operator can move the shift lever 2 to the second position. The releasing section 7 maintains release of the restriction while the shift lever 2 is moving. In a case where a new shift position of the shift lever 2 is detected by the position detecting section 8, the releasing section 7 cancels the release of the restriction. The new shift position includes a preceding shift position (first position).

Figure 4:
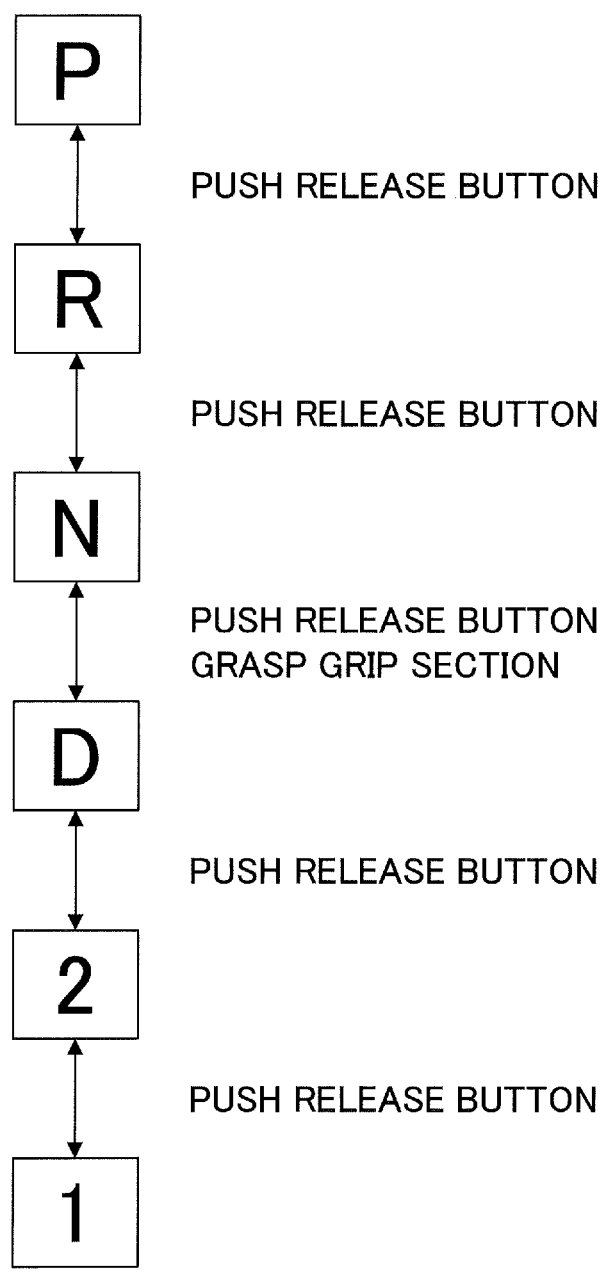
FIG. 4 is a diagram illustrating an example of a first position and a second position.

FIG. 4 is a diagram illustrating an example of a first position and a second position that are set with respect to the shift positions in FIG. 1. In the example of FIG. 4, each of the N range and the D range is set as a first position. The D range is set as a second position of the N range, and the N range is set as a second position of the D range.

In the example of FIG. 4, when the release button 5 is pushed, restriction of movement of the shift lever 2 is removed, between the P range and the R range, between the R range and the N range, between the N range and the D range, between the D range and the 2 range, and between the 2 range and the 1 range. Further, the restriction on movement of the shift lever 2 between the N range and the D range is removed when the operator grasps the grip section 3. By setting the first positions and the second positions as illustrated in FIG. 4, the operator can shift from N to D, or from D to N, without excessive operation.

As described above, according to the present embodiment, the movement of the shift lever 2 is restricted by the restricting section 6, unless the operator grasps the grip section 3 or pushes the release button 5. Accordingly, the shift lever 2 is not moved even if an object hits the shift lever 2. In such a manner, movement of the shift lever 2 unintended by the operator is avoided. In other words, erroneous operation of the shift lever 2 is avoided. Accordingly, vehicle safety is improved.

Further, according to the present embodiment, the restriction on the shift lever 2 that is positioned at a first position is removed by the operator grasping the grip section 3. Thus, the operator can quickly move the shift lever 2 from a first position to the second position. As each of the first position and second position, positions where emergency operation is required are set, and delays in operating the shift lever 2 in an emergency can be decreased. Thereby, vehicle operability is improved.

The present invention is not limited to the configuration described in the embodiment, or the like, including a combination of the configuration and one or more other elements. These aspects can be modified without departing from the spirit of the present invention, and can be appropriately determined according to the application form.

What is claimed is:

1. A shift device comprising:
   a shift lever configured to move to a plurality of positions;
   a grip section mounted on the shift lever and configured to be grasped by a user;
   a pressure sensor mounted on the grip section and configured to detect a varying strength applied by contact with the user, the pressure sensor being configured to output a signal indicating the varying strength of the contact with the user, the varying strength increasing as the contact with the user increases;
   a restricting section configured to restrict movement of the shift lever; and
   a releasing section configured to determine whether the grip section is grasped b the user based on a result of detection by the pressure sensor, and release the shift lever from restriction of the movement upon determining that the grip section is grasped by the user,
wherein based on the result of detection, the releasing section is configured to determine, in response to receiving the signal from the pressure sensor, that the grip section is grasped by the user upon a determination that the strength indicated by the received signal meets or exceeds a threshold.

2. The shift device according to claim 1, further comprising a position detecting section configured to detect a position of the shift lever, and
wherein the releasing section is configured to release the shift lever from the restriction of the movement being restriction of movement from a first position to a second position, upon determining that the grip section is grasped by the user and detecting the shift lever at the first position by the position detecting section.

3. The shift device according to claim 2, wherein each of the first position and the second position is one of a drive range and a neutral range.

4. The shift device according to claim 1, wherein the releasing section is configured to determine that the grip section is grasped by the user, upon detecting the result of detection meeting a predetermined condition,
wherein the predetermined condition includes, in addition to the determination that the strength of the signal meets or exceeds the threshold, a condition that the contact with the user is continuously detected for a predetermined period.

5. The shift device according to claim 1, further comprising a release button mounted on the grip section, and
wherein the releasing section is configured to release the shift lever from the restriction of the movement upon detecting, the release button being pushed, without using the result of detection by the pressure sensor.

6. The shift device according to claim 1, wherein the pressure sensor includes a sensor for covering at least a portion of the grip section.

* * * * *